Patented July 11, 1939

2,166,070

UNITED STATES PATENT OFFICE 2,166,070

EGG WHITE PRODUCT AND PROCESS OF PREPARING THE SAME

Verne D. Littlefield, Beverley Hills, Calif., assignor to Armour and Company, Chicago, Ill., a corporation of Illinois No Drawing. Application August 11, 1937, Serial No. 158,576

18 Claims. (Cl. 99—113)

This invention relates to egg white products and processes of preparing the same, and it comprises, as a new material, a dried egg white of acid reaction containing an aluminum compound and it further comprises processes wherein liquid egg whites are acidified, a water soluble, non-toxic aluminum compound added thereto, and the entire mixture dried.

Dried egg whites are used to a large extent in the food industry, frequently as additions to baking powder, prepared flours, and the like, but more usually the dried egg whites are dissolved in water and the aqueous solution whipped to give foams for addition to baking batters as levening and binding agents.

The preparation of a satisfactory dried egg white product is attended with considerable difficulty although in my co-pending application, Serial No. 158,431, filed August 10, 1937, I have described and claimed superior ways of preparing a dried egg white material which, when reconstituted with water, gives foams of large volume and unusually fine stability. All commercially prepared dried egg whites, with the exception of those described in my aforesaid application, are fermented before drying. And the egg whites of my aforesaid application, although not fermented, are allowed to age after drying since such aging improves the whipping qualities of the egg white. Egg whites made by fermentation methods are not aged after drying and the whipping qualities of the fermented, dried whites are not improved by aging. Fermentation, however, results in putrefaction with the development of objectionable odor. The processes of the aforesaid application make a satisfactory product without fermentation by employing a period of aging, and also regulation of hydrogen ion concentration to certain definite values during the acidification of the egg white prior to drying.

The present invention relates to a dried egg white product which has superior whipping characteristics immediately after drying, but without the necessity for fermentation of the egg white prior to drying, or the necessity for a period of aging after drying as described in my aforesaid application. The present invention is based upon the observation that if water soluble, non-toxic aluminum compounds are added to acidified egg whites and the whole mass immediately dried, the dried product will give foams of pronounced stability without the necessity for aging or fermentation. Thus, I am able to avoid, by the present invention, the necessity for aging the dried egg whites over long periods of time. In many relations the presence of aluminum compounds in the egg white is entirely unobjectionable, although when I wish to prepare an egg white material free of added substances I find it better to practice the processes of the aforesaid application. The presence of aluminum compounds in the egg white is quite unobjectionable when the egg white is to be admixed with baking powders, when the egg white is to be added to flour to form dry batter mixtures, which, when milk or water is added thereto, would give cake-making batters, and usually unobjectionable when the whites, after reconstitution with water, are whipped to give foams used as leavening agents. I shall now describe detailed ways of preparing my egg white product. The liquid egg white, which can be either freshly cracked from the egg, or thawed frozen egg white is first strained through a filter to free it of any bits of shell, chalazae or stringy portions. Then the egg white is run into a large vat, the usual capacity of which is about 15,000 pounds, and an acid solution is added with agitation until the pH of the egg white is decreased to about 3.9 or 4. The pH can be decreased to as low as 3 when a final product having a somewhat acid taste is unobjectionable. pH values higher than 4 can also be used, and the pH range can be fixed at about 3 to 5 with the optimum about 3.9 to 4.1. There are many different acids which can be used for the purpose of acidifying the egg whites although I find that tartaric acid is the most desirable acid. Instead of using tartaric acid I can add citric, lactic, malic, phosphoric, sulfuric or hydrochloric. None of these have any effect on the egg albumin itself, but they markedly modify the other proteins of the white. The acid reduces the viscosity of the egg white so that it is as fluid as water. I can also use mixtures of acids, such as mixtures of tartaric and lactic, citric and phosphoric and the like. When using tartaric acid about 8 pounds thereof dissolved in water, are added to each 1,000 pounds of egg material since this gives a pH of about 3.9 to 4. When using stronger inorganic acids, such as hydrochloric, I prefer to first dilute them with water, advantageously about 5 to 10 volumes of water for each volume of acid. During the acidification it is desirable to take small samples for determining the actual hydrogen ion concentration of the mixture as the acidification proceeds.

After acidifying the liquid egg whites in the manner stated I then add a water soluble non-toxic aluminum compound to the mixture. Ammonium alum is one of the best materials to use. This is ammonium aluminum sulfate and I add about 9 pounds thereof for each 1,000 pounds of egg material. Various other aluminum compounds can be used, such as aluminum chloride, aluminum sulfate, aluminum tartrate, the various sodium and potassium alums and mixtures thereof. Quite probably the aluminum salt hydrolyzes to some extent so that the final dried product will contain at least a part of the aluminum as aluminum hydroxide. The actual amount of aluminum present as combined aluminum per pound of dried product should be about ¾ to 4 grams. One and one-half grams of aluminum is enough to give high whipping volume and stability and those practicing my invention will have no difficulty in determining the proper amount of any aluminum salt to be added from the fact that the final dried product should have about 2 grams of combined aluminum per pound. The egg white solids themselves amount to about 12% to 13% of the total liquid egg white treated. After the addition of the aluminum compound the mixture is thoroughly stirred to keep the materials in suspension and the whole liquid mass is run through a filter to remove any large particles of flocculent materials. Undoubtedly, the large amount of albumin present acts as a protective colloid so that the aluminum salt and any aluminum hydroxide formed by hydrolysis is maintained in suspension. The straining operation referred to is for the purpose of removing any flocculent material and is simply employed to prevent clogging of the nozzles of the spray drier when spray drying is used as the drying method. Otherwise, straining or screening after the addition of the aluminum compound is optional.

The quantity of the aluminum compound added can vary over wide limits but for best results no less than about 1 gram of aluminum for each pound of dried product should be present. The quantity can be increased greatly but an aluminum content above 2 grams per pound does not improve the foam stability enough to warrant the added cost of production.

The mixture of liquid egg white, aluminum compound and acid is then spray dried, or pan dried in the usual way for drying egg whites. Egg whites have long been dried by spray drying methods so I shall not describe this procedure in detail.

The final dried product has a slightly acid reaction but is entirely free of any odor. This is true even though the raw egg white itself may have had a slightly off odor referred to as musty. The removal of odors from the original egg white is inherent in my process and so far as I am aware no one has been able to accomplish odor removal in any other type of egg treating process. The final dried product, as it comes from the drier and reconstituted with water, will give foams which have superior foam stability, such that no breakdown of the foam occurs for a satisfactory period of time, usually thirty minutes after thorough whipping. Possibly the aluminum compound present functions as a kind of drying agent to increase the water-holding properties of the foam and thus make the foam more stable.

It is unnecessary to observe any particular temperature control during the acidification and treatment of the egg whites prior to drying. The addition of the acid and alum or other aluminum salts effectively prevents putrefaction. Moreover, the egg whites are treated so rapidly that no opportunity for fermentation can occur therein. I can, however, operate at temperatures as low as 45° to 50° F. and as high as 75° or 80° F., and, consequently, do not wish to be limited to any particular range of temperatures. Most always my process is carried out at ordinary room temperature.

The acids I add are first dissolved in water to insure quicker and better mixing. Thus, for example, I make up a tartaric or citric acid solution and add this to the white. Likewise, I can use acid salts rather than the pure acids. I can, for example, use acid tartrates, such as potassium hydrogen tartrate, and other acid salts and achieve approximately the same results. My final dried product will have an acid reaction, the pH thereof lying between about 3 and 5. Its aluminum content will, on the average, be about 2 grams per pound of dried material with the effective range running from about ¾ to 4 grams per pound. An aluminum content of more than 2 grams per pound is unnecessary insofar as good results are concerned, but I give this range to indicate the scope of my invention. Of course, it is understood that the aluminum present is in the product as combined aluminum. I am not prepared to state the exact state of aluminum salt since it is conceivable that some of the aluminum may be in the product as the aluminum salt added, another portion may be there as aluminum hydroxide and still further amounts of aluminum may be present as an albumin salt of complex structure. Double salts of aluminum, tartaric acid and the albumin may also exist and the only way I have of adequately defining my dried product with reference to the amount of aluminum is by referring to the amount of combined aluminum in a pound of the dried material. This can be determined easily by analytical methods.

My invention is also applicable to the treatment of egg whites from which most of the proteins other than egg albumin have been removed. Thus I can acidify the egg whites, allow any precipitate formed to settle as a sludge, draw off the clear acidified white, add the aluminum salt thereto and dry. The resulting product has high foam stability. Consequently, in the appended claims, egg white is intended to embrace raw liquid egg white and also liquid egg whites from which materials insoluble when the whites are liquefied by acidification have been separated.

Having thus described my invention, what I claim is:

1. A dried egg white having a pH of between about 3 and 5 and having about 1 to 4 grams of aluminum hydroxide per pound of dried material.

2. A dried egg white containing small amounts of tartaric acid and aluminum hydroxide.

3. A dried egg white containing small amounts of aluminum hydroxide and having an acid reaction.

4. The process of preparing a dried egg white material which comprises acidifying liquid egg whites, adding a water soluble, non-toxic aluminum compound thereto, and drying the resulting mixture.

5. The process of preparing an egg white material which comprises acidifying liquid egg whites, adding ammonium aluminum alum thereto, and drying the mixture.

6. The process of preparing an egg white material which comprises adding tartaric acid to liquid egg whites, admixing a water soluble, non-toxic aluminum compound therewith, and drying the resulting mixture.

7. The process of preparing an egg white material which comprises adding tartaric acid to liquid egg whites, adding an aluminum alum thereto, and drying the mixture.

8. The process of preparing an egg white material which comprises adding tartaric acid and ammonium aluminum alum to liquid egg whites, and drying the mixture.

9. The process which comprises acidifying liquid egg whites until the pH thereof is between about 3 and 5, adding a water soluble, non-toxic aluminum compound thereto and drying the mixture.

10. The process of preparing an egg white material which comprises acidifying liquid egg whites with tartaric acid until the pH lies between about 3 and 5, adding an aluminum alum thereto, and drying the mixture.

11. The process of preparing an egg white material which comprises adding tartaric acid to liquid egg whites until the pH is about 3.9 to 5, admixing a small amount of ammonium aluminum alum therewith, and drying the mixture.

12. The process of preparing an egg white material which comprises adding tartaric acid to liquid egg whites in the proportions of about 8 pounds of tartaric acid to each 1,000 pounds of liquid egg white, admixing ammonium aluminum alum therewith in proportions of about 9 pounds of alum to each 1,000 pounds of egg white, and drying the mixture.

13. A dried egg white containing small amounts of an aluminum alum and having an acid reaction.

14. A dried egg white containing small amounts of ammonium aluminum alum and having an acid reaction.

15. A dried egg white containing small amounts of tartaric acid and an aluminum alum.

16. A dried egg white containing small amounts of tartaric acid and ammonium aluminum alum.

17. The process of preparing an egg white material which comprises acidifying liquid egg whites, adding an aluminum alum thereto, and drying the resulting mixture.

18. The process of preparing an egg white material which comprises adding an aluminum alum to a liquid egg white having a pH of between about 3 and 5, and drying the mixture.

VERNE D. LITTLEFIELD.